3,759,695
PROCESS FOR MAKING FERROSILICON
James H. Downing, Clarence, N.Y., assignor to
Union Carbide Corporation
No Drawing. Filed Sept. 25, 1967, Ser. No. 670,401
Int. Cl. C22d 7/00; C21c 5/52; C21b 1/08
U.S. Cl. 75—10                                    2 Claims

ABSTRACT OF THE DISCLOSURE

An electric furnace submerged arc process for making ferrosilicon by reacting agglomerates of finely divided carbon, iron ore and silica.

---

The present invention relates to the manufacture of ferrosilicon alloys. More particularly, the present invention is directed to an improved electric furnace process for making ferrosilicon using iron ore together with silica and carbon as the starting materials.

At the present time it is known to manufacture ferrosilicon by furnacing a charge comprising a mixture of finely divided quartz, coke and metallic iron in an electric furnace using submerged arc techniques. This practice has been found to provide a suitable 50% silicon ferrosilicon and the inclusion of finely divided iron metal admixed with the quartz and carbon reductant has the desirable effect of lowering the reaction temperature required for the $SiO_2+C$ reduction reaction which without the use of iron is on the order of 1800° C.

However, in spite of this advantage, finely divided iron is not sufficiently inexpensive to make the process commercially attractive under all circumstances and it does not appear likely that finely divided iron can be economically produced from scrap in the foreseeable future.

It is therefore an object of the present invention to provide a process for producing ferrosilicon in which an iron bearing starting material can be economically employed.

It is another object of the present invention to provide an electric furnace process for producing ferrosilicon wherein improved electrical efficiency is obtained.

It is a further object of the present invention to provide a process for producing ferrosilicon wherein increased product recovery is obtained.

Other objects will be apparent from the following description and claims.

The present invention is directed to a process for making ferrosilicon, i.e., an iron-silicon alloy containing 45 to 50% silicon balance mostly iron, which alloy has previously required relatively large amounts of electrical energy for its production by the conventional reaction of silica and carbon and the additional iron metal.

A process in accordance with the present invention for the production of ferrosilicon wherein reduced amounts of electrical energy are required comprises (1) forming a mixture of finely divided carbon, iron ore and silica into agglomerates with the proportion of iron and silicon in the agglomerates being such as to provide a ferrosilicon alloy containing 45 to 50% silicon upon reduction of the iron ore and silica, and with the amount of carbon being between about 105 and 115% of the amount theoretically required to react with the silica to produce silicon metal and carbon monoxide; (2) charging the aforesaid agglomerates to an electric furnace and (3) heating the electric furnace by means of at least one electrode submerged in the charge of agglomerates to cause reaction of the agglomerated materials and the formation of a ferrosilicon alloy containing from about 40 to 50% silicon.

The process of the present invention has derived from the discovery that in the manufacture of ferrosilicon, if iron ore is mixed and agglomerated with silica and carbon, and if the carbon is controlled within certain limits, the agglomerated materials can be furnaced to produce ferrosilicon with the use of surprisingly low quantities of electrical energy. It has been believed in the past that if iron ore were mixed with silica and carbon, that a considerable increase in electrical energy input would be required in order to cause reduction of the added iron ore and this actually happens if the carbon in the agglomerated charge is not controlled. For example, if more than about 115% of the amount of carbon required to reduce the silica in the charge and form carbon monoxide is employed, considerably more electrical energy is required to produce ferrosilicon as compared to the present invention and also when compared to previously employed production techniques. Similar results are also obtained when about 100% of the carbon requirement is used. However, when between 105 and 115% of the carbon requirement is used in accordance with the present invention, optimum conditions for low power consumption are obtained and in addition, high rates of product recovery are achieved. Particularly advantageous results are obtained when between about 110 and 112% of the carbon requirement is used.

This surprising benefit is believed to be due to a reduction of the iron ore by both CO gas and carbon which occurs when carbon is provided in amounts above about 105% of silica stoichiometry, together with a high electrical resistance in the charge, which exists so long as the carbon is not more than 115% of stoichiometric.

In the practice of the present invention, standard techniques can be employed in preparing the charge agglomerates and commercially available materials can be used. For example, the silica can be in the form of quartz or sand, the carbon reducing agent can be metallurgical grade coal or coke and the iron ore can be selected from the following or other grades:

| Iron ore | Percent | | |
|---|---|---|---|
| | Fe | $SiO_2$ | $Al_2O$ |
| Orinoco | 65.0 | 1.05 | 1.25 |
| Brazilian hematite | 70.2 | 0.5 | 0.7 |
| LacJeannine | 65.9 | 5.5 | 0.6 |

In preparing the charge agglomerates, the carbon, iron ore and silica are finely divided, e.g. to 200 mesh and finer, blended, and then pelletized or briquetted using a convenient binder such as lignin.

Suitable sizing for the charge agglomerates is ½"–1". When agglomerates have been prepared as described above they are charged to an electric furnace of the type customarily used in ferroalloy production and heated by means of submerged electrodes to cause reaction between the charge constituents and the formation of a molten metal product.

The product is tapped following the usual procedure with ferrosilicon alloys.

The following examples of the making of "50%" ferrosilicon will further illustrate the present invention.

EXAMPLE I

A charge mixture was prepared in accordance with Table I(a).

TABLE 1(a)

| | |
|---|---|
| $SiO_2$ | Flour. |
| Percent | 44.1 (approx). |
| Size | 8μ. |
| Fe | Braz. H [1] |
| Percent | 30.9. |
| Size | 200×D. |
| Reducing agent | East Gulf.[2] |
| Percent | 25. |
| Size | 150×D. |
| Binder | ⅔ lignin+⅓ sodium silicate. |
| Percent $SiO_2$ stoic. | 113. |

[1] Brazilian hematite:

| | Percent |
|---|---|
| Fe | 70.2 |
| $SiO_2$ | 0.52 |
| $Al_2O_3$ | 0.70 |

[2] East Gulf Coal:

| | |
|---|---|
| Fixed C | 79.7 |
| Volatiles | 15.0 |
| Ash | 4.5 |

The mixture of Table I(a) was blended and pelletized to form agglomerates approximately ½ inch in diameter and these agglomerates were then charged to a furnace. The agglomerate charge was heated by two carbon submerged electrodes to cause reduction of the oxide constituents and to thereby produce molten ferrosilicon alloy. The following Table I(b) shows the results obtained.

TABLE I(b)

| K.w.h./lb. Si: | Percent Si rec. |
|---|---|
| 4.93 | 98.98 |

EXAMPLE II

Following substantially the same procedure as in Example I, a charge was prepared as shown in Table II(a). Table II(b) shows the results obtained.

TABLE II(a)

| | |
|---|---|
| $SiO_2$ | Flour. |
| Percent | 43.5 (approx). |
| Size | 8μ. |
| Fe | Braz. H. |
| Percent | 30.4. |
| Size | 200×D. |
| Reducing agent | East Gulf. |
| Percent | 26.1. |
| Size | 150×D. |
| Binder | Lignin. |
| Percent $SiO_2$ stoic. | 119.5. |

TABLE II(b)

| K.w.h./lb. Si: | Percent Si rec. |
|---|---|
| 6.48 | 81.53 |

EXAMPLE III

Following substantially the same procedure as in Example I, except that the charge mixture was not agglomerated, a charge mixture was prepared as shown in Table III(a) and Table III(b) which obtained the following results:

TABLE III(a)

| | |
|---|---|
| $SiO_2$ | Quartz. |
| Percent | 50.2. |
| Size | 2″ x ½″. |
| Fe | Scrap. |
| Percent | 23.2. |
| Size | Turnings. |
| Reducing agent (percent): | |
| Coke [1] | 13.25. |
| Coal [2] | 13.25. |
| Stoich. percent | 105. |

| | Percent |
|---|---|
| [1] Coke, fixed C | 90 |
| [2] New River Coal: | |
| Fixed C | 72.5 |
| Volatiles | 23.12 |
| Ash | 4.54 |

TABLE III(b)

| K.w.h./lb. Si: | Percent Si rec. |
|---|---|
| 5.86 | 93.33 |

In order to demonstrate the advantages attained by the process of the present invention, some of the data of the foregoing examples have been tabulated in Table IV.

TABLE IV

| Example: | Percent $SiO_2$ stoich. | Power consumption, kw./lb. of tapped silicon | Percent silicon recovery |
|---|---|---|---|
| I | 113 | 4.93 | 98.98 |
| II | 119 | 6.48 | 81.53 |
| III | 105 | 5.86 | 93.33 |

Following the same general procedure as in Example 1 additional experimental scale tests were performed using pelletized charges and the results are shown in Table V.

TABLE V

| | Percent $SiO_2$ stoich. | Power consumption, kw./lb. of tapped silicon | Percent silicon recovery |
|---|---|---|---|
| A | 105 | 7.8 | 82.1 |
| B | 110 | 7.2 | 85.7 |
| C | 115 | 9.9 | 64.4 |

It can be seen from Tables IV and V that Examples I of Table IV and B of Table V in accordance with the present invention provide the lowest consumption of electrical energy per pound of tapped metal at a high rate of silicon recovery. It can be further seen from Tables IV and V that the most advantageous results are obtained using stoichiometries of 110% and 113%.

On the other hand, Example II of Table IV, which involved the use of 119% carbon stoichiometry, and Example III of Table IV which corresponds to the previous practice, show considerably higher electrical energy requirements.

The mesh sizes referred to herein are U.S. Series.

What is claimed is:

1. A process for making ferrosilicon which comprises
    (1) forming a mixture of finely divided carbon, iron ore and silica into agglomerates, the proportions of iron and silicon in said agglomerates being such as to provide a ferrosilicon alloy containing 45 to 50% Si upon reduction of the iron ore and silica to the metallic state, and the amount of carbon being between about 105 and 115% of the amount theoretically required to react with the silica to produce silicon metal and carbon monoxide;
    (2) charging the agglomerates into an electric furnace;
    (3) heating the briquets in the electric furnace by means of an electrode submerged in the agglomerate charge to cause reduction of the briquet material and the formation of a molten ferrosilicon alloy; and
    (4) subsequently tapping the molten ferrosilicon alloy from the electric furnace.
2. A process in accordance with claim 1 for making ferrosilicon wherein the amount of carbon is between about 110% and 113% of the amount theoretically required to react with said silica to produce silicon metal and carbon monoxide.

(References on following page)

References Cited

UNITED STATES PATENTS

| | | | |
|---|---|---|---|
| 1,863,642 | 6/1932 | Stimson | 75—133.5 |
| 2,776,885 | 1/1937 | Koopal | 75—133.5 |
| 3,215,522 | 11/1965 | Kuhlmann | 75—10 |
| 3,382,063 | 5/1968 | Imperato | 75—3 |
| 3,393,068 | 7/1968 | Robiette | 75—44 |
| 3,431,103 | 3/1969 | Querengasser | 75—130.5 |

FOREIGN PATENTS

| | | | |
|---|---|---|---|
| 1,032,747 | 6/1966 | Great Britain | 75—11 |

L. DEWAYNE RUTLEDGE, Primary Examiner

P. D. ROSENBERG, Assistant Examiner

U.S. Cl. X.R.

75—3, 11, 133.5